United States Patent [19]
Karube et al.

[11] Patent Number: 4,921,357
[45] Date of Patent: May 1, 1990

[54] LASER OSCILLATOR DEVICE

[75] Inventors: Norio Karube, Machida; Akira Egawa, Minamitsuru; Etsuo Yamazaki, Hachioji; Nobuaki Iehisa, Minamitsuru; Mitsuo Manabe, Hachioji, all of Japan

[73] Assignee: Fanuc Ltd., Minamitsuru, Japan

[21] Appl. No.: 283,478

[22] PCT Filed: Apr. 28, 1988

[86] PCT No.: PCT/JP88/00425
§ 371 Date: Dec. 2, 1988
§ 102(e) Date: Dec. 2, 1988

[87] PCT Pub. No.: WO88/08629
PCT Pub. Date: Nov. 3, 1988

[30] Foreign Application Priority Data
Apr. 30, 1987 [JP] Japan .................. 62-107826

[51] Int. Cl.⁵ .............................................. H01S 3/00
[52] U.S. Cl. .................................... 372/38; 372/29
[58] Field of Search ............... 378/38, 81, 87; 372/29, 372/33

[56] References Cited
U.S. PATENT DOCUMENTS
4,706,252 11/1987 Egawa et al. .

Primary Examiner—Léon Scott, Jr.
Attorney, Agent, or Firm—Staas & Halsey

[57] ABSTRACT

A laser oscillator device applies a high-frequency voltage to a plurality of discharge regions through a dielectric for producing a high-frequency discharge for laser pumping. The laser oscillator device includes a DC power supply (16), and a high-frequency power supply (18, 19, 20, 21) for converting a DC voltage into a high-frequency voltage. The DC power supply (16) and the high-frequency power supply (18, 19, 20, 21) are coupled to each other by a filter (30). The filter (30) prevents a high-frequency component from being fed back from the high-frequency power supply (18, 19, 20, 21) to prevent the laser oscillator device from operating unstably due to parasitic oscillation. Other arrangements are disclosed for preventing interference between the high-frequency power supply and the DC power supply.

5 Claims, 4 Drawing Sheets

LASER OSCILLATOR DEVICE

TECHNICAL FIELD

The present invention relates to a laser oscillator device for producing a high-power laser beam for cutting workpieces of metal or the like, and more particularly to a laser oscillator device capable of stable high-frequency discharge pumping.

BACKGROUND ART

High-frequency discharge pumping axial-flow $CO_2$ lasers are in the process of being developed because of their advantages of high-power output and stable oscillation. One example of such laser is disclosed in Japanese Patent Application No. 61-243212 filed by the applicant.

A conventional axial-flow-type high-frequency discharge pumping laser oscillator device is illustrated in FIG. 5 of the accompanying drawings. The illustrated laser oscillator device includes a discharge tube 1 comprising four tube segments. However, the discharge tube 1 may have a desired number of tube segments dependent on the output to be produced. A total reflection mirror 2 and an output coupling mirror 3 are accurately positioned at the ends of the discharge tube 1. Denoted at 4 is an outgoing laser beam. The segments of the discharge tube 1 have gas inlet and outlet ports connected to a single roots blower 7. Cooling units 5, 6 serve to cool a laser gas heated by the discharge and the roots blower 7. The laser gas flows in the discharge tube 1 and gas delivery tubes in the directions of the arrows. Electrodes $8a$, $8b \sim 11a$, $11b$ are connected to respective high-frequency power supplies 12, 13, 14, 15. The gas flows in the discharge tube 1 at the speed of about 100 m/second. An electric discharge is produced in the discharge tube 1 by a high-frequency voltage applied by the high-frequency power supplies $12 \sim 15$ to generate laser oscillation.

The principles of a conventional high-frequency power supply is illustrated in FIG. 6 of the accompanying drawings. Denoted at 16 is a DC power supply, and 17 a high-frequency (RF) power supply. DC output from the DC power supply 16 is applied to the high-frequency power supply 17. The high-frequency power supply 17 comprises a branch circuit composed of four FETs $18 \sim 21$, a boost transformer 22, and an impedance matching circuit 23. The output terminals of the high-frequency power supply 17 are coupled to the discharge tube 1 through electrodes $8a1$, $8a2$. A CT coil 24 serves to detect a current flowing through the discharge tube 1. A current feedback line 25 feeds back the detected current to control the current supplied to the discharge tube 1 to be constant.

The high-frequency discharge pumping laser has the following many advantages over the ordinary DC discharge pumping laser:

(i) Since it produces an electrode-free discharge, there is no problem of electrode material deterioration.
(ii) No ballast resistor is required.
(iii) There is no cathode drop, and high energy efficiency is obtained.
(iv) The laser can be operated at a low voltage and hence is safe for the operator.
(v) The dissociation ratio of $CO_2$ is low, and so is the running cost.
(vi) The laser has excellent pulse characteristics.
(vii) The laser device can be reduced in size.
(viii) The phenomenon of electron capture can be utilized by sufficiently increasing the frequency.
(ix) The freedom of selection of discharge tube materials is high.

As a high-frequency device, however, the high-frequency discharge pumping laser device is unstable in operation and components such as FETs may be destroyed because of parasitic oscillation in various loops thereof. Moreover, these phenomena may occur suddenly irrespective of the magnitude of the laser output, thus lowering the reliability of the laser device.

SUMMARY OF THE INVENTION

It is an object of the present invention to provide a high-frequency oscillator device which will solve the aforesaid problems and which will operate stably without sending an alarm signal to a DC power supply and destroying components such as FETs due to this kind of parasitic oscillation.

According to a first embodiment, there is provided a laser oscillator device for applying a high-frequency voltage to a plurality of discharge tubes made of a dielectric to produce a high-frequency discharge for laser pumping. The oscillator comprises:
  a DC power supply;
  a high-frequency power supply for converting a DC voltage into a high-frequency voltage; and
  a filter by which said DC power supply and said high-frequency power supply are coupled to each other.

According to a second embodiment, there is provided a laser oscillator device for applying a high-frequency voltage to a plurality of discharge tubes made of a dielectric to produce a high-frequency discharge for laser pumping. The oscillator comprises:
  a DC power supply;
  a high-frequency power supply for converting a DC voltage into a high-frequency voltage; and
  a coupling line by which said DC power supply and said high-frequency power supply are coupled to each other, said coupling line having a shield grounded near said high-frequency power supply.

According to a third embodiment, there is provided a laser oscillator device for applying a high-frequency voltage to a plurality of discharge tubes made of a dielectric to produce a high-frequency discharge for laser pumping. The oscillator comprises:
  a DC power supply;
  a high-frequency power supply for converting a DC voltage into a high-frequency voltage; and
  a feedback line for feeding back a current from an input of said high-frequency power supply.

According to the first embodiment, a high-frequency component from the high-frequency power supply is prevented from being fed back to the DC power supply by the filter.

According to the second embodiment, a high-frequency component from the high-frequency power supply is prevented by the shield which is grounded near the high-frequency power supply.

According to the third embodiment, the impedance as viewed from the DC power supply is lowered by the feedback line to prevent high-frequency oscillation.

DESCRIPTION OF THE PREFERRED EMBODIMENT

Embodiments of the present invention will hereinafter be described in specific detail with reference to the drawings.

Figure 1:
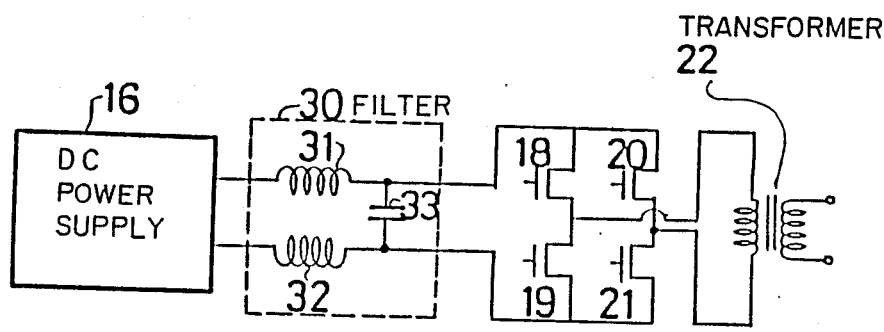
FIG. 1 is a circuit diagram of a first embodiment of the present invention.

FIG. 1 is a circuit diagram of an embodiment of the present invention. Designated at 16 a DC power supply and at 30 is a filter. The filter 30 comprises inductances 31, 32 and a capacitor 33. The inductances 31, 32 and the capacitor 33 have values determined by the capacity of the DC power supply 16 and the lengths of cables used. A branch circuit comprises FETs 18~21 and serves as a high-frequency inverter for converting a direct current into an alternating current having a high frequency ranging from 1 to 10 MHz. An output transformer supplies an output current to a discharge tube through an impedance matching circuit. This circuit arrangement feeds back high-frequency noise from the high-frequency power supply to the DC power supply 16. This makes the output from the DC power supply 16 unstable, causes generation of an alarm signal and sometimes semiconductor devices in the DC power supply 16 or the FETs 18~21.

According to the present invention, the filter 30 removes a high-frequency component from the high-frequency power supply thus, enabling stable laser pumping. The filter may be of an inverted-L configuration, but use of the illustrated two inductances is effective in a high-frequency power supply of a few MHz.

Figure 2:
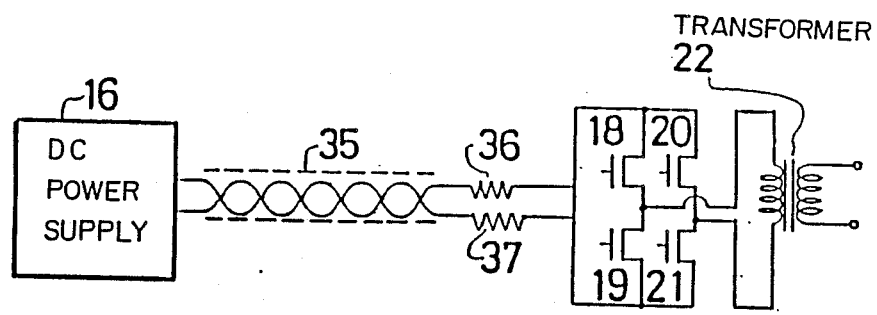
FIG. 2 is a circuit diagram of a second embodiment of the present invention.

FIG. 2 is a circuit diagram of a second embodiment. Those parts which are identical to those shown in FIG. 1 are denoted by identical reference numerals, and will not be described in detail. As shown in FIG. 2, a power transmission cable 35 has a shielded pair-wire structure with wires connected in series with resistors 36, 37, respectively. The resistors 36, 37 serve to cancel out negative resistive components of the wires in the cable 35. The the values of the resistors 36, 37 are determined from the values of the negative resistive components in the cable 35 in a high frequency range and help prevent oscillation in the cable 35 and present a high-frequency component from the high-frequency power supply from affecting the DC power supply 16.

Figure 3:
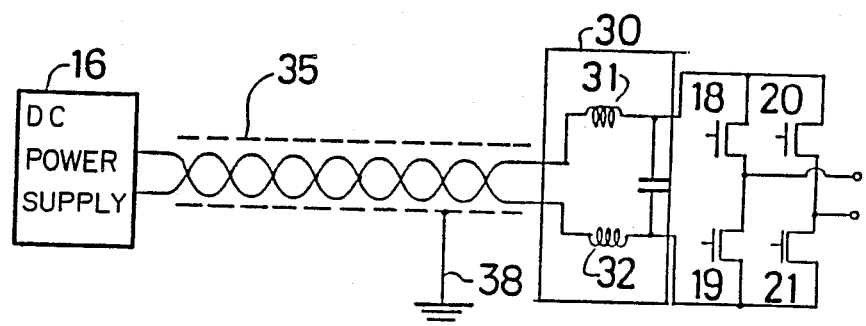
FIG. 3 is a circuit diagram of a third embodiment of the invention.

FIG. 3 is a circuit diagram of a third embodiment. Those parts which are identical to those shown in FIGS. 1 and 2 are denoted by identical reference numerals, and will not be described in detail. As shown in FIG. 3, a filter 30 is associated with the high-frequnecy power supply. The shield of the cable 35 is grounded near the high-frequency power supply through a shield grounding line 38. The grounded shield of the cable 35 prevents a high-frequency component from being transmitted to the DC power supply 16.

Figure 4:
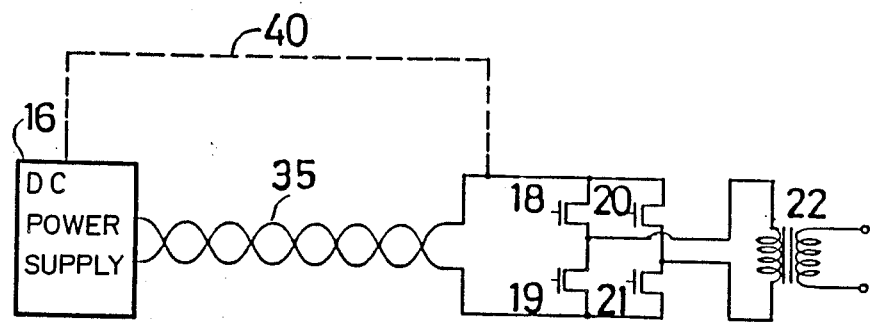
FIG. 4 is a circuit diagram of a fourth embodiment of the invention.
Figure 5:
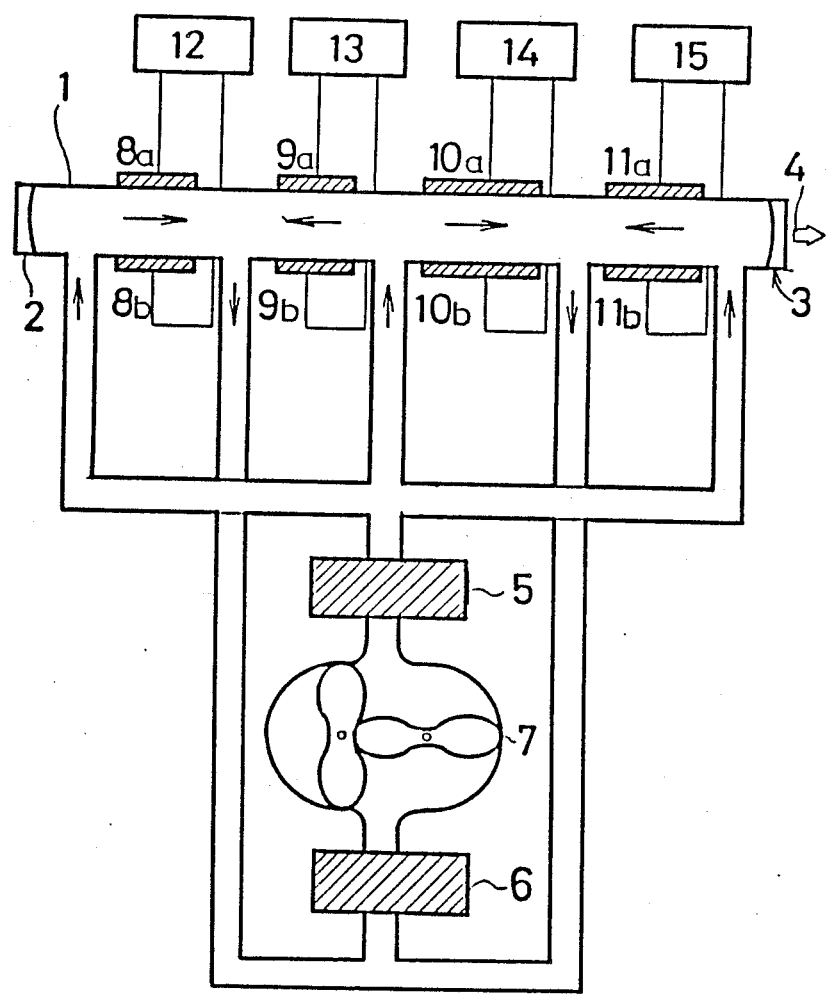
FIG. 5 is a block diagram of a conventional axial-flow RF discharge pumping laser oscillator device.
Figure 6:
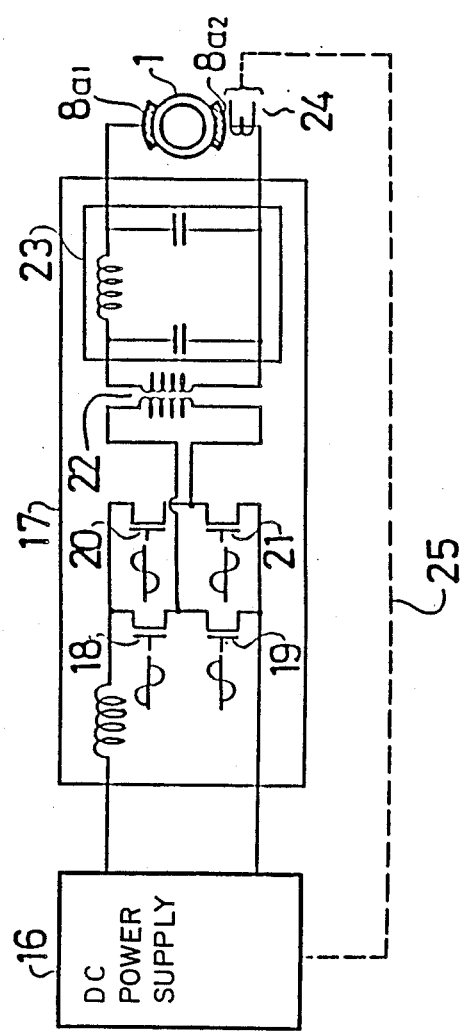
FIG. 6 is a view schematic diagram of a conventional high-frequency power supply circuit for laser pumping.

FIG. 4 is a circuit diagram of a fourth embodiment. Those parts which are identical to those shown in FIG. 1 are denoted by identical reference numerals, and will not be described in detail. The input of the high-frequency power supply is fed back to the DC power supply through a line 40 to lower the output impedance of the DC power supply 16 for preventing a high-frequency component from being fed back through the cable 35 to the DC power supply 16. The cable 35 is illustrated as being a pair-wire cable, but may be a shielded pair-wire cable.

With the present invention, as described above, since the laser oscillator device is arranged to prevent a high-frequency component from being transmitted from the high-frequency power supply to the DC power supply. Therefore, the instability of the laser oscillator device due to parasitic oscillation can be removed.

We claim:

1. A laser oscillator device for applying a high-frequency voltage to a plurality of discharge regions through a dielectric to produce a high-frequency discharge for laser pumping, comprising:
    DC power supply means for providing a DC voltage;
    high-frequency power supply means for converting the DC voltage into a high-frequency voltage including a high-frequency signal component; and
    filter means for coupling said DC power supply means and said high-frequency power supply and for blocking the high-frequency signal component from being feedback to said DC power supply means to thereby stabilize said DC power supply means.

2. A laser oscillator device according to claim 1, wherein said filter means comprises an LC filter circuit.

3. A laser oscillator device according to claim 1, wherein said filter means comprises a resistor.

4. A laser oscillator device for applying a high-frequency voltage to a plurality of discharge regions through a dielectric to produce a high-frequency discharge for laser pumping, comprising:
    DC power supply means for providing a DC voltage;
    high-frequency power supply means for converting the DC voltage into a high-frequency voltage including a high-frequency signal component; and
    coupling line means for coupling said DC power supply means and said high-frequency power supply and for blocking the high-frequency signal component from being feedback to said DC power supply means to thereby stabilize said DC power supply means, said coupling line means further including a shield grounded near said high-frequency power supply means.

5. A laser oscillator device for applying a high-frequency voltage to a plurality of discharge regions through a dielectric to produce a high-frequency discharge for laser pumping, comprising:
    DC power supply means for providing a DC voltage and having an output impedance;
    high-frequency power supply means for converting the DC voltage into a high-frequency voltage; and
    feedback line means for feeding back a current from an input of said high-frequency power supply to said DC power supply means so as to lower the output impedance of said DC power supply means and to block the high-frequency signal component from being feedback to said DC power supply means to thereby stabilize said DC power supply means.

* * * * *